US006285778B1

(12) United States Patent
Nakajima et al.

(10) Patent No.: US 6,285,778 B1
(45) Date of Patent: Sep. 4, 2001

(54) VEHICLE SURROUNDINGS MONITOR WITH OBSTACLE AVOIDANCE LIGHTING

(75) Inventors: Masato Nakajima; Junichi Yamaguchi, both of Tokyo; Hiroya Akita, Kanagawa; Yoshihiro Tsuji, Shizuoka; Kazuyuki Sasaki, Shizuoka; Naoto Ishikawa, Shizuoka, all of (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 08/468,231

(22) Filed: Jun. 6, 1995

Related U.S. Application Data

(63) Continuation of application No. 08/217,131, filed on Mar. 24, 1994, now abandoned, which is a continuation of application No. 07/945,482, filed on Sep. 15, 1992, now abandoned.

(30) Foreign Application Priority Data

Sep. 19, 1991 (JP) .................................... 3-239551
Jun. 29, 1992 (JP) .................................... 4-170559

(51) Int. Cl.[7] ............................................. G06K 9/00
(52) U.S. Cl. ........................ 382/104; 180/167; 318/587; 340/443
(58) Field of Search ..................... 382/104, 107, 382/106, 154, 199; 364/424.02, 436; 180/166–170; 250/559.16, 559.2; 318/568.12, 568.19, 587; 340/901–904, 443; 342/70, 457; 348/113–118; 761/1, 117, 207, 300, 301, 302

(56) References Cited

U.S. PATENT DOCUMENTS 4,278,142 * 7/1981 Kono ..................... 180/168
4,634,879 * 1/1987 Penney ................... 356/376
4,833,469 * 5/1989 David .................... 340/901
4,948,258 * 8/1990 Caimi .................... 356/376
4,954,962 * 9/1990 Evans, Jr. et al. ............. 364/424.02
5,081,585 * 1/1992 Kurami et al. ................ 364/424.02
5,136,512 * 8/1992 Le Borne ................... 364/461
5,148,322 * 9/1992 Aoyama et al. ............... 359/708
5,220,508 * 6/1993 Ninomiya et al. .............. 364/449
5,331,312 * 7/1994 Kudoh .................... 340/541
5,343,206 * 8/1994 Ansaldi et al. ............... 342/70
5,347,456 * 9/1994 Zhang et al. ................ 364/424.02

OTHER PUBLICATIONS

K. Nakazawa et al., "Element Surface Extraction Method for 3–D Shape Measurement Using Fiber Grating Vision Sensor System", Faculty of Science and Technology, Keio University (1986).

J. Yamaguchi et al., "A 3–D Shape Identification System using a Fiber Grating Vision Sensor", Faculty of Science and Technology, Keio University (1990).

Le Moigue et al. "Structured Light Patterns for Robot Mobility." IEEE Journal of Robotics and Automation, vol. 4, No. 5 pp. 541–548 Oct. 1988.*

* cited by examiner

*Primary Examiner*—Jay Patel
(74) *Attorney, Agent, or Firm*—Armstrong, Westerman, Hattori, McLeland & Naughton, LLP

(57) ABSTRACT

The vehicle surroundings monitor detects the sizes and positions of obstacles, ditches and humans as well as the depths of the ditches to provide the driver with sufficient information to secure safety during driving. The pattern light projector receives an incoming laser beam and projects a light spot matrix in the form of a regular grating onto the monitored area. The camera photographs the light spot pattern on the monitored area and sends image signals to the data processor which processes the image signals to detect the presence of any obstacle, ditch or human. Based on the steering angle detected by the steering angle sensor, the path the car will take is predicted and a possible contact or collision of the car with the obstacle is detected beforehand. The buzzer, voice synthesizer and display device are used to alert the driver and indicate the presence of the obstacles, the possible contact with them and the location where the possible contact will occur.

8 Claims, 13 Drawing Sheets

F I G. 2 a
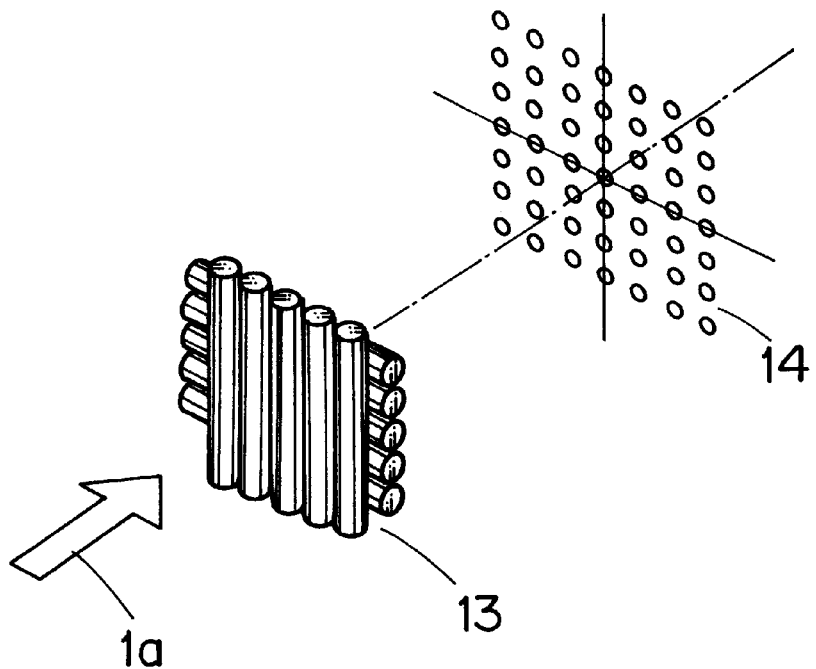
F I G. 2 b
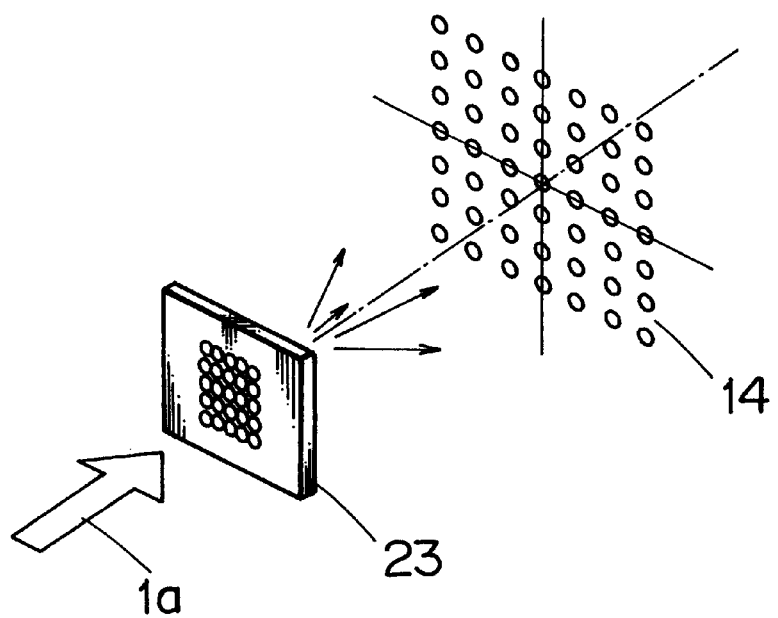

| LIGHT SPOT NO. | U | V | I |
|---|---|---|---|
| 1 | 101 | 50 | 50 |
| 2 | 110 | 60 | 80 |
| 3 | 120 | 50 | 60 |
| ⋮ | ⋮ | ⋮ | ⋮ |
| BACKGROUND 1 | · | · | 10 |
| 2 | · | · | 15 |
| 3 | · | · | 10 |
| 4 | · | · | 20 |

VEHICLE SURROUNDINGS MONITOR WITH OBSTACLE AVOIDANCE LIGHTING

This application is a continuation of application Ser. No. 08/217,131 filed Mar. 24, 1994, now abandoned, which was a continuation of grandparent application Ser. No. 07/945,482, filed Sep. 15, 1992, now abandoned.

BACKGROUND OF THE INVENTION

FIELD OF THE INVENTION

This invention relates to a vehicle surroundings monitor and, more specifically, to a vehicle surroundings monitor which monitors the surroundings of a vehicle such as an automobile to support a driver in checking safety during vehicle driving.

A vehicle surroundings monitor for automobiles has been available, in which the distance to an obstacle is detected by measuring the time it takes for an ultrasonic wave, which is emitted from an ultrasonic wave transmitter and reflected by the obstacle, to return to a wave receiver.

There is also a method in which a television camera is mounted on the rear part of the roof of a vehicle so that the driver is given a rearward view on a TV monitor of an interested area when the vehicle is moving backward.

Of the above-mentioned conventional apparatuses, the one which uses the ultrasonic wave transmitter and receiver cannot detect the positions and sizes of obstacles and ditches and the depths of the ditches. Hence, it cannot fully support the driver in confirming safety in the near surroundings of the vehicle during driving.

In the method that uses a TV monitor, on the other hand, it may be difficult to distinguish the obstacles or ditches from the level ground depending on their shapes. Especially during nighttime, there may be cases where obstacles cannot be identified unless sufficiently illuminated.

SUMMARY OF THE INVENTION

This invention has been accomplished to overcome the above drawbacks and its object is to provide a vehicle surroundings monitor which can detect the sizes, positions and depths of obstacles, ditches or humans and thereby give adequate aid for the driver to confirm the safety in the near surroundings of the vehicle while driving.

To solve the above problems, the vehicle surroundings monitor according to this invention comprises: a pattern light projector which receives a laser beam and projects a light spot pattern onto the monitored area; a camera for photographing the light spot pattern; and a data processor which processes images supplied from the camera to detect the presence of obstacles, grooves or humans.

The data processor consists of: a reference data generating means which extracts a light spot pattern from pixel data, the pixel data being produced from the image signals supplied by the camera that photographed the light spot pattern thrown upon a flat road surface, and which generates reference data of the light spot pattern including the coordinates of each light spot; a detecting means which compares the light spots of the reference data with light spots which are extracted from pixel data, the pixel data being produced from the image signals supplied by the camera that photographed the light spot pattern thrown upon a road surface being examined, in order to detect the presence of obstacles, ditches or humans; a height correction means which corrects the reference data according to changes in the height of the pattern light projector and the camera from the road surface; and a brightness correction means which corrects the brightness of pixel data—which is produced from image signals supplied by the camera that photographed the light spot pattern thrown upon the road surface being examined— according to a difference between the brightness of a background other than the light spots and the background brightness of the reference data.

The vehicle surroundings monitor also has a vehicle path prediction means to calculate the path the vehicle will take and thereby predict a possible contact or collision of the car with obstacles.

The vehicle surroundings monitor also has at least one of a buzzer, voice synthesizer and display device to inform the driver of the presence of obstacles and the location where the automobile is predicted to contact the obstacles.

In the above configuration, the pattern light projector receives an incoming laser beam and projects a light spot matrix in the form of a regular grating onto the monitored area (in the embodiment the monitored area is the ground surface being examined). When there is any obstacle, ditch or human within the monitored area, the three-dimensional positions of the light spots thrown onto these objects change resulting in local disturbances of the light spot projection image obtained from the camera. By processing the image disturbances it is possible to detect the sizes and positions of the obstacles.

When the height of the pattern light projector and the camera from the road surface changes, the reference data is corrected accordingly. Therefore, when the car is weighed down by heavy goods or passengers, the vehicle surroundings monitor can detect obstacles, ditches or persons correctly. When the brightness of the background other than the light spots changes, the brightness of the pixel data on the monitored road surface can be corrected according to the amount of brightness change. This prevents erroneous detection of light spots, which would otherwise result from an increased brightness by brake lamp illumination. At the same time, the display device shows the size and position of the obstacle with or without an alarm buzzer sound. Further, the apparatus predicts the path the car will follow and shows on the display device the location where the car will contact or collide with the obstacle to alert the driver.

BRIEF DESCRIPTION OF THE DRAWINGS

FIG. 2a and FIG. 2b are schematic diagrams each showing a fiber grating and a multi-beam projector as a pattern light projection element;

DETAILED DESCRIPTION OF PREFERRED EMBODIMENT

Figure 1:
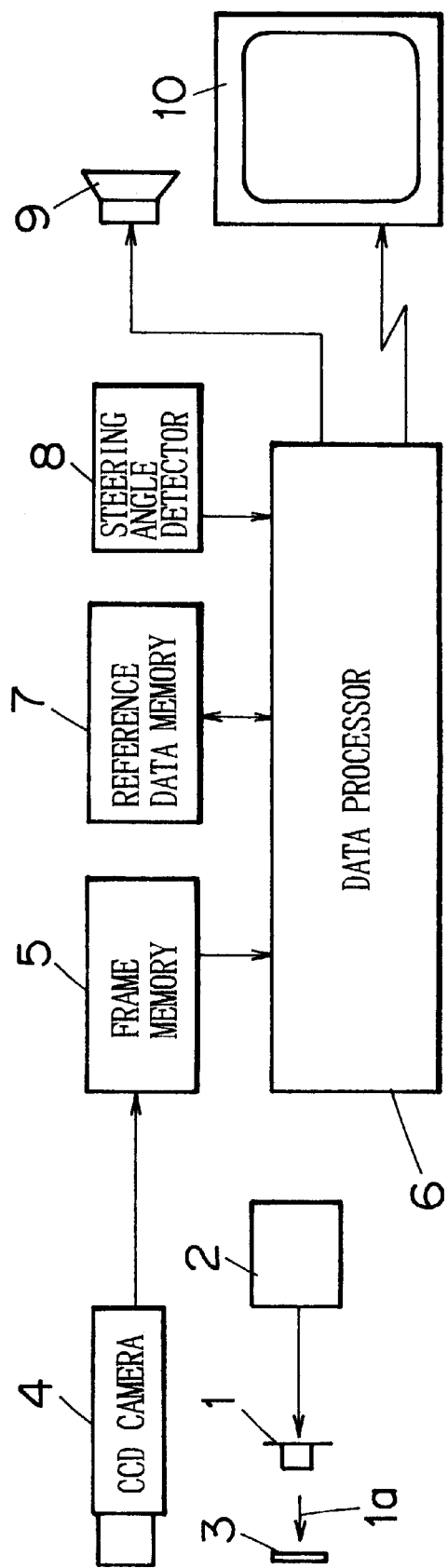
FIG. 1 is a schematic diagram showing the configuration of the vehicle surroundings monitor as one embodiment of this invention.

Now, embodiments of this invention will be described by referring to the attached drawings. FIG. 1 shows one embodiment configuration of the vehicle surroundings monitor according to this invention. In the figure, reference numeral 1 represents a laser beam source; 2 a laser beam source drive apparatus for driving the laser beam source 1; 3 a pattern light projection element which receives the laser beam 1a from the laser beam source 1 to project a light spot matrix onto the monitored area; 4 a CCD camera to photograph the light spot matrix; 5 a frame memory to temporarily store the video signal obtained from the CCD camera 4; 6 a data processor consisting of a computer that operates according to a predetermined program; 7 a reference data memory which stores beforehand the image data of a level ground without an obstacle as the reference data; 8 a steering angle detector that detects the steering angle of the steering wheel; 9 a buzzer for sounding an alarm; and 10 a display device.

The pattern light projection element 3 may utilize a fiber grating 13 of FIG. 2a or a multi-beam projector 23 of FIG. 2b.

The fiber grating 13 of FIG. 2a consists of two sheets, stacked together 90 degrees out of phase, of about 100 optical fibers arranged side by side, each fiber measuring several tens of $\mu$m in diameter and 10 mm in length. When the laser beam 1a generated by the laser beam source 1 is thrown upon the fiber grating 13, the laser beam is focused at focal points of individual fibers and thereafter expands as spherical wavefronts interfering with each other, with the result that the light spot matrix 14 like a regular grating is projected onto the projection surface.

The multi-beam projector 23 of FIG. 2b consists of a large number of microlenses integrated in a thin transparent plate. The laser beam 1a emitted from the laser beam source 1 is transformed into multiple beams by the multi-beam projector 23 so that the light spot matrix 14 of a regular grating is projected onto the projection surface.

In the above configuration, the light spot matrix 14 projected by the pattern light projection element 3 (fiber grating 13 or multi-beam projector 23) onto the monitored area is photographed by the CCD camera 4. The video signal produced by the CCD camera 4 is temporarily stored in the frame memory 5 and then taken into the data processor 6. The data processor 6 compares the image data from the frame memory 5 with the reference data prestored in the reference data memory 7 to determine the distance of movement of the light spot on the image plane 4b of the CCD camera 4.

Figure 3:
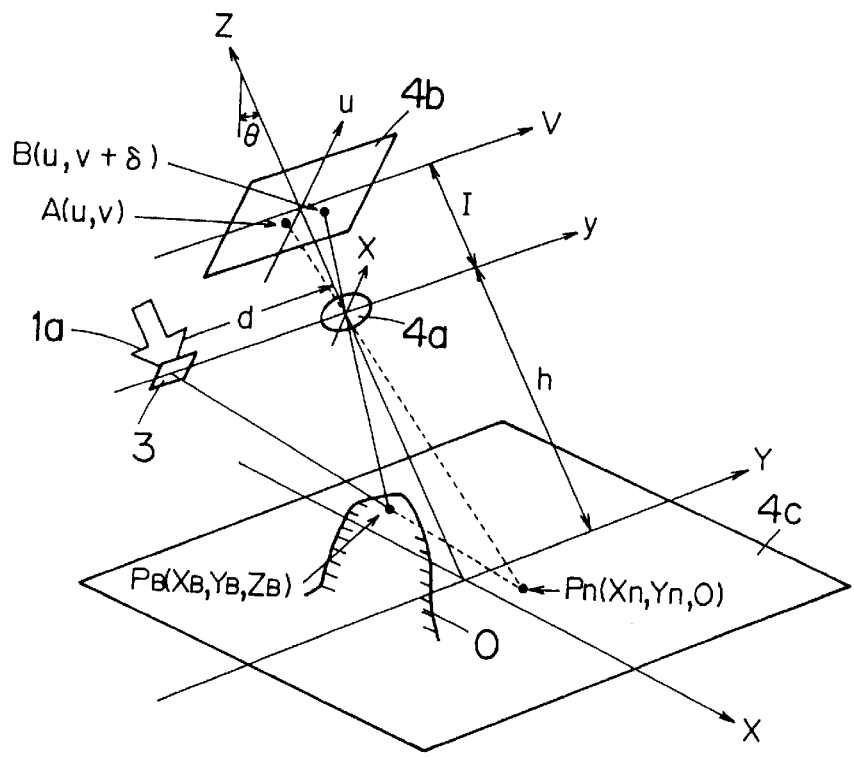
FIG. 3 is a diagram showing the detail of the optical arrangement of the apparatus of FIG. 1.

FIG. 3 shows the optical arrangement of the embodiment of FIG. 1, in which the lens 4a of the CCD camera 4 is taken as an origin, the pattern light projection element 3 is located a distance d from the origin on the y-axis, and the image plane 4b is located a distance I from the origin on the Z-axis. In this optical arrangement, the light spot which is to be projected at point $P_n$ ($X_n$, $Y_n$, 0) when the monitored area 4c (the field of view of the CCD camera) is a flat ground (flat road surface) without an obstacle is projected onto point $P_B$ ($X_B$, $Y_B$, $Z_B$) on an object O because there is the object O in the monitored area 4c. On the image plane 4b of the CCD camera 4 that photographs the light spot, therefore, the point A (u, v) corresponding to the point $P_n$ ($X_n$, $Y_n$, 0) moves to the point B (u, v+$\delta$) corresponding to the point $P_B$ ($X_B$, $Y_B$, $Z_B$). In other words, the light spot moves in a certain direction.

Hence, by determining the distance between the point A and the point B, the amount of movement $\delta$ can be detected. The data processor 6 performs processing on the distances d, I, the distance h from y-axis to the monitored area 4c, the angle $\theta$ formed by the CCD camera's light axis and the normal to the monitored area 4c, and the amount of displacement d in order to determine the three-dimensional position of the light spot (in FIG. 3 the point $P_B$ ($X_B$, $Y_B$, $Z_B$)). In this way, the three-dimensional positions are determined for all light spots in the input image. The calculation is performed on the light spots whose three-dimensional positions have changed, thus determining the rough sizes and positions of obstacles, ditches or humans and showing them on the display apparatus 10.

Figure 4:
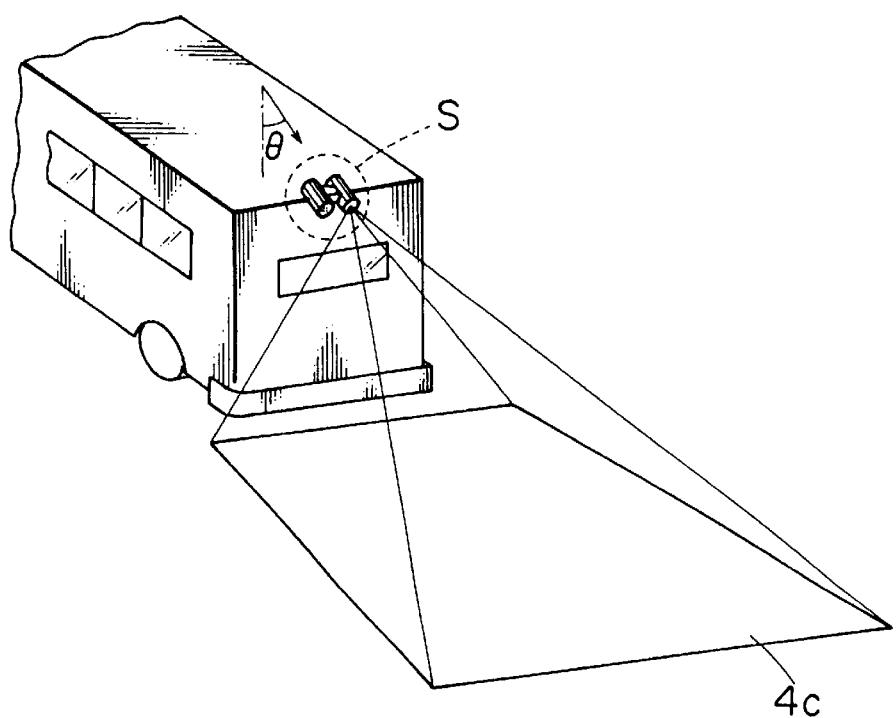
FIG. 4 is a schematic diagram showing an example arrangement of the sensor section made up of the pattern light projection element, a laser light source and a CCD camera of FIG. 1.

FIG. 4 shows one example arrangement where the sensor section S—made up of the pattern light projection element 3, the laser beam source 1 and the CCD camera 4—is fixed at the rear part of the vehicle at an angle $\theta$ with respect to the normal line to the ground.

Figure 5:
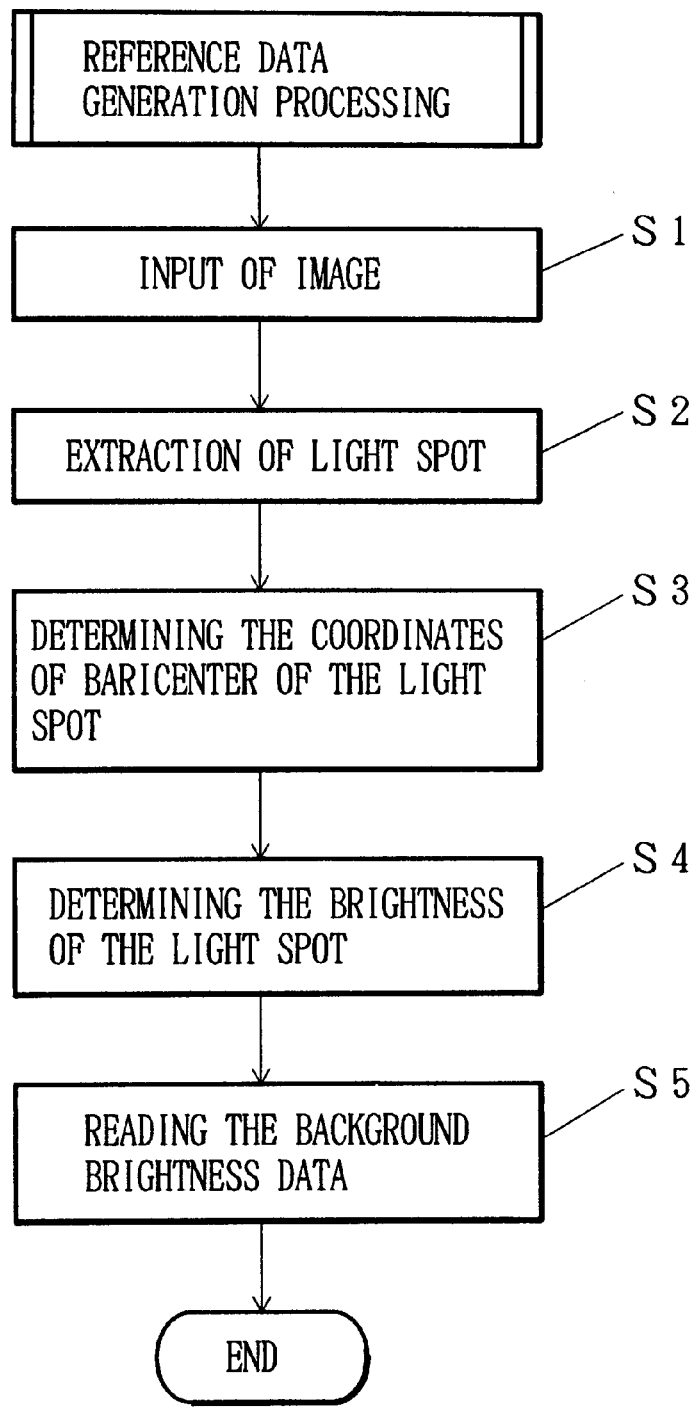
FIG. 5 is a flowchart showing the process of operations performed by a data processor in FIG. 1.
Figure 6:
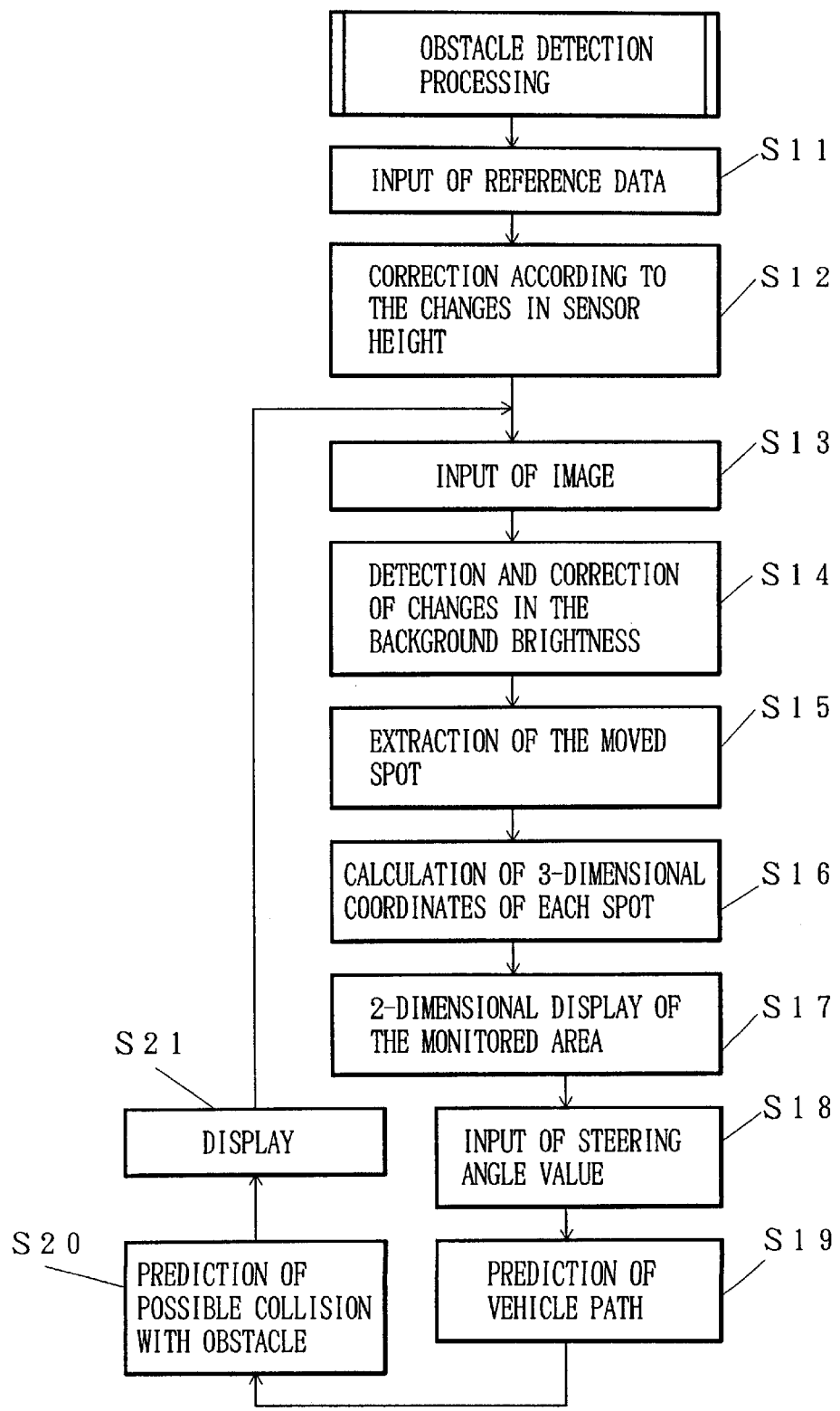
FIG. 6 is a flowchart showing another process of operations performed by the data processor in FIG. 1.

The processing performed by the data processor 6 consists largely of a reference picture data (reference data) generating processing and an obstacle detection processing shown in the flowcharts of FIGS. 5 and 6.

In the reference data generating processing, as shown in the flowchart of FIG. 5, the image signal of the light spot matrix 14 photographed by the CCD camera 4 is taken in at step S1, transformed into pixel data of 512×512 pixels with 0–255 gradations of shade and then temporarily stored in the frame memory 5. The pixel data temporarily stored in the frame memory 5 is processed by the data processor 6 to extract the light spots at step S2. Then step S3 determines the coordinates of the baricenter of the light spot. Step S4 determines the brightness of the light spot, i.e., the threshold value for extracting the light spot during inspection. The processing further moves to step S5 to read the background brightness data necessary for the correction of brightness.

Figure 7:
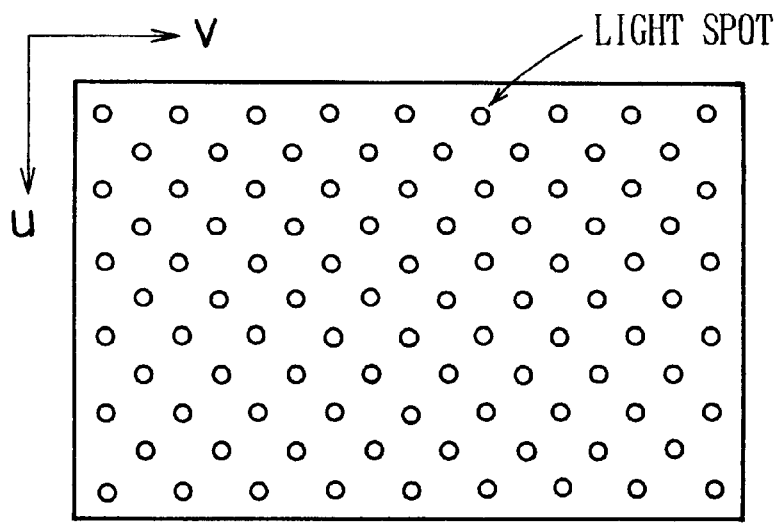
FIG. 7 is a diagram showing a light spot projection image in the monitored area.
Figure 8:
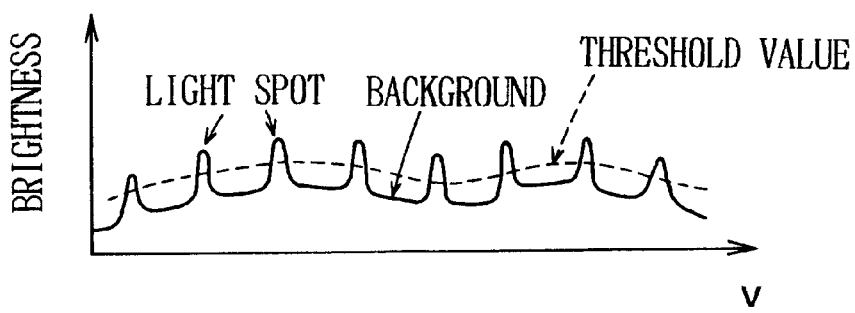
FIG. 8 is a graph showing the distribution of brightness on a single scanning line.
Figure 9:
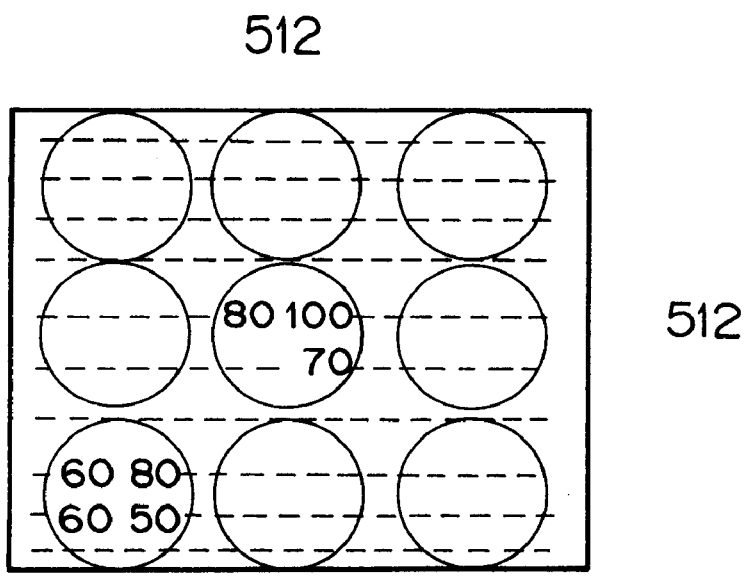
FIG. 9 is a diagram showing the pixel data of light spots obtained by the light spot extraction processing.
Figure 10:
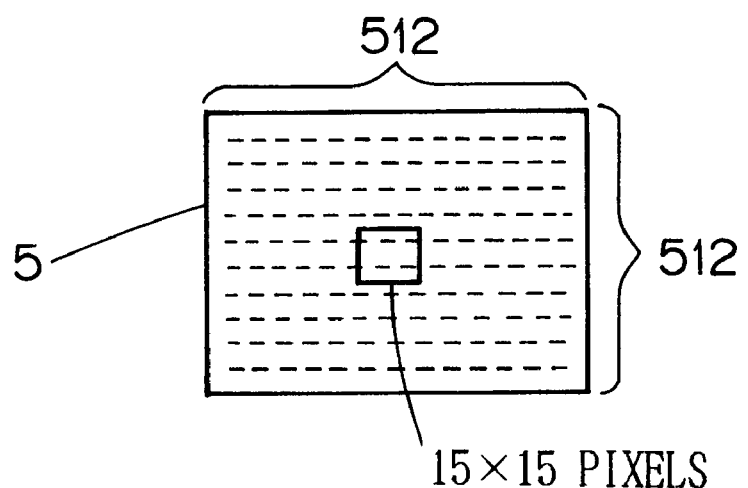
FIG. 10 is a diagram showing the pixel data in the frame memory.

The light spot extraction processing of step S2 extracts light spots by comparing with the threshold value the brightness on each scanning line, as shown in FIG. 8, in the light spot projection image in the monitored area of FIG. 7. In this processing, if for each pixel data in the frame memory 5 the gradation value of the pixel is larger than the preset threshold value, the gradation value is left as is. If the gradation value is smaller than the threshold value, it is set to zero. This processing is carried out one pixel at a time for all pixels. As a result, clusters of pixels (light spots) as shown in FIG. 9 are extracted.

Where there is a large difference in brightness between each light spot and thus the light spot cannot be extracted with a fixed threshold value, the following steps are taken. An average brightness is taken of a window of m×n pixels at the center of which is located the pixel being examined, as shown in FIG. 10, and the brightness of the pixel is compared with the average value to determine whether or not the pixel in question should be left as is. Similar processing is done for other pixels and the average threshold that varies from one pixel to another is used to extract the light spot.

Next, we will explain about the processing of step S3, i.e., the processing for determining the coordinate position of the light spot baricenter. This processing determines the coordinate position of the light spot baricenter (U, V) by assigning the brightness weight to each pixel in the light spot.

In the next step S4, which determines the brightness of the light spot (threshold value of the brightness), the minimum value of the pixels that form the light spot is taken to be the brightness of the light spot baricenter. As to the light spot shown in FIG. 11, I(min)=50 and therefore the brightness of the light spot baricenter is 50.

Figures 11, 12:
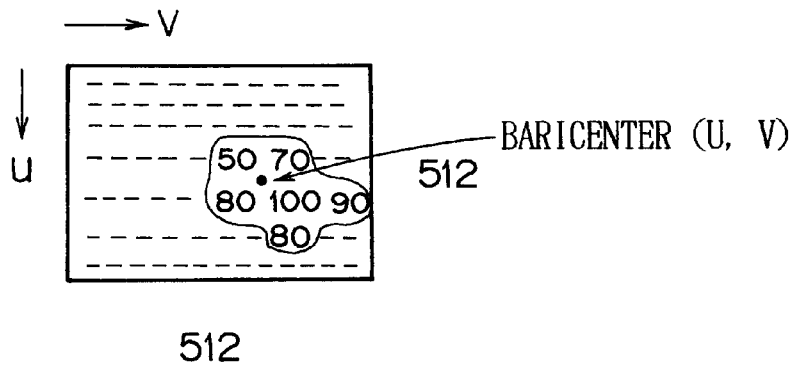
FIG. 11 is a diagram explaining the method of determining the baricenter of light spots.
FIG. 12 is a diagram showing generated reference data.

With the above processing performed, it is possible to obtain for each light spot number the final reference light spot data (reference data) consisting of the light spot baricenter, its brightness and the background data (position and brightness) as shown in FIG. 12. The final reference light spot data is stored in the reference data storage section 7. By executing the flowchart of FIG. 5, the data processor 6 works as a reference data generating means to generate the reference data including the light spot coordinates, the threshold value of each light spot and the background data by using the pixel data transformed from the image signal from the camera that photographs the light spot pattern projected onto the flat road surface.

The obstacle detection processing, as shown in the flowchart of FIG. 6, first takes in the reference data from the reference data storage section 7 at step S11. At step S12, the sensor height changes are corrected. Then step S13 takes in a picture and step S14 detects changes in the brightness of the background of the picture taken in and also compensates for the brightness changes. The program then proceeds to step S15 which extracts a moved spot. This is followed by step S16 which calculates the three-dimensional coordinates of each spot. Step S17 performs the two-dimensional display of the monitored area. Step S18 takes in the steering angle value; step S19 predicts the path the vehicle will take; step S20 predicts collision with an obstacle; and step S21 displays the predictions before returning to step S13.

The correction of the sensor height changes at step S12 is performed for the following reasons. To determine the three-dimensional position $P_B$ ($X_B$, $Y_B$, $Z_B$), the distance h and the reference data including the three-dimensional coordinates on the image plane 4b are taken in. The reference data uses the coordinates when the vehicle is not loaded with heavy goods because the vehicle height h is the one measured when the car is not loaded. The reference data including the three-dimensional coordinates on the image plane 4b of each light spot that is on a flat road surface are stored in memory as reference values, which will be used for determining the actual positions of each light spot. When the vehicle is traveling on an uneven road surface, the actual three-dimensional coordinates of each light spot are determined based on the deviation of the light spot coordinates during the actual measurement from the reference values that were determined with no load carried.

When the vehicle is used, it is loaded with passengers and goods, which might amount to several tens of kilograms to several hundred kilograms, weighing the vehicle down by several centimeters. The vehicle may not sink uniformly and may be inclined depending on the arrangement of the heavy goods.

Since the vehicle surroundings monitor is fixed to the car body as shown in FIG. 4, the sinking of the vehicle makes the monitor come near the monitored area 4c of the road surface. In that case, when viewed from the vehicle surroundings monitor, the area 4c that was a distance h away from the CCD lens 4a rises upward by an amount equal to the vehicle sinking, so that the vehicle surroundings monitor decides that the road surface as a whole rises several centimeters. If the load carried is heavy, the amount of sinking is large causing the monitor to issue an erroneous alarm that there is a projecting object on the road which is high enough to be detrimental to normal running of the vehicle.

Figure 13:
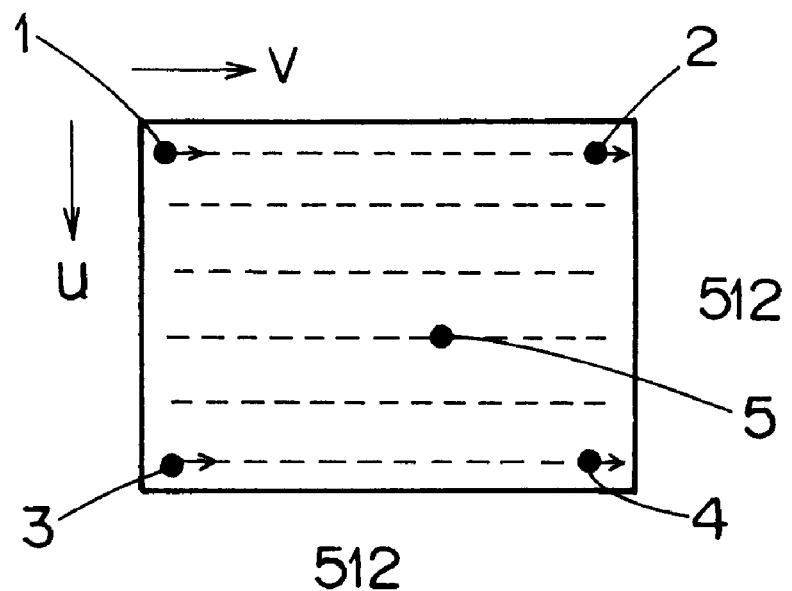
FIG. 13 is a diagram explaining the method of making a height correction.

To eliminate such inconveniences, it is necessary to measure the amount of road rising or the amount of vehicle sinking on an almost flat road surface with passengers and loads on board. For this purpose, as shown in FIG. 13, the amount of road rising for the monitored area is determined from the displacements of light spots 1, 2, 3, 4 at four corners of the monitored area. Based on the road rising value, it is possible to calculate the amount of rising of each light spot by linear approximation. The road surface rising thus detected occurred as a result of vehicle sinking and is used as a correction value in determining the three-dimensional coordinates of the actual uneven road surface.

During the actual measurement, correction is made on the three-dimensional coordinates of the road surface determined from the light spots by using the correction value (by subtracting the correction value from the coordinates). Hence, accurate three-dimensional coordinates that are adjusted for the vehicle sinking can be obtained.

In the above example, the correction values are calculated for the light spots 1–4 at four corners of the monitored area 4c. If the inclination of the vehicle is small when compared with the vehicle sinking, it is possible to determine the height of the road surface at only one point, for example, light spot 5 and use this height as the correction value for all light spots. In either case, the three-dimensional coordinates of light spots at several points on the flat road surface with passengers on board are used as vehicle sinking correction values during the actual measurement.

Figure 14:
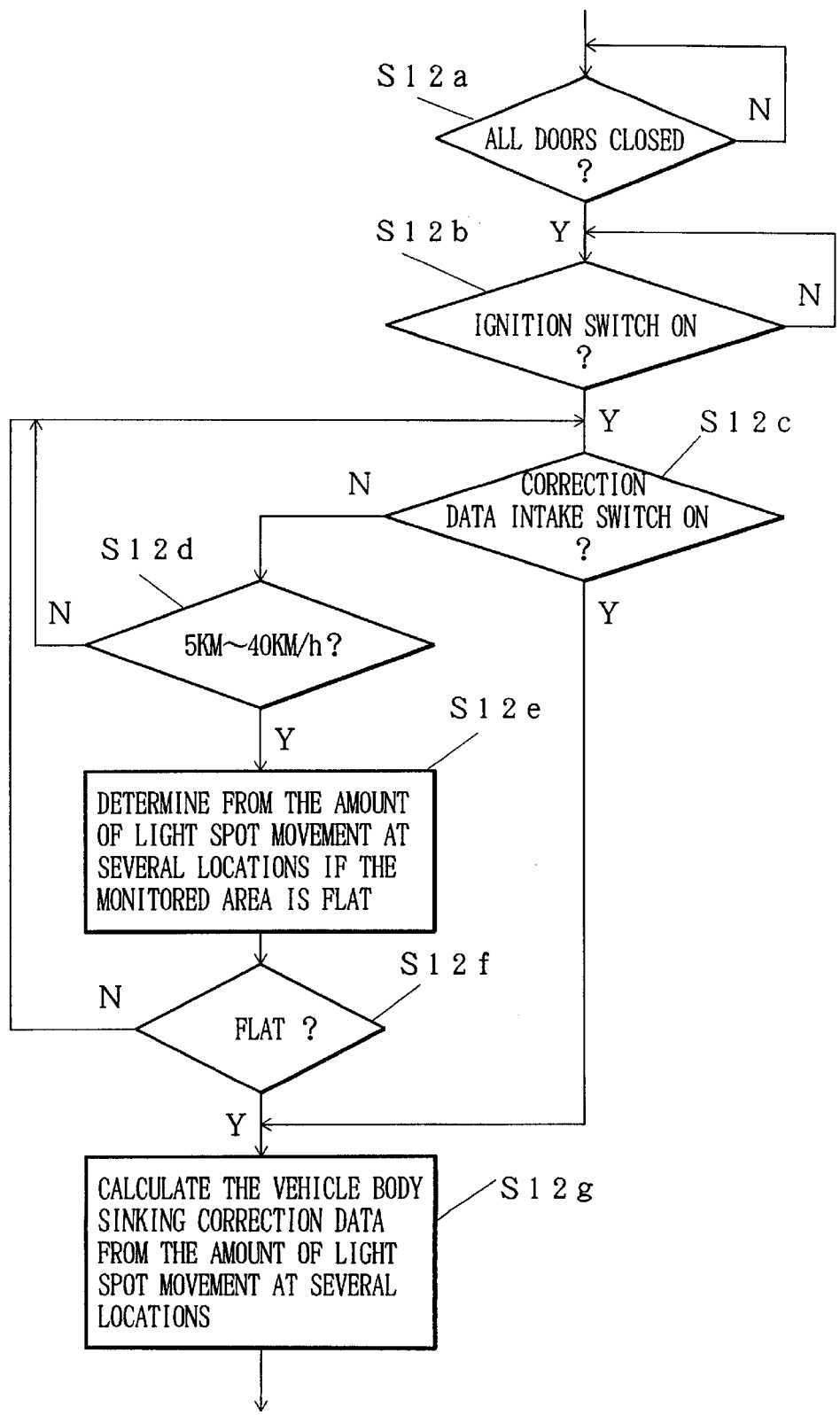
FIG. 14 is a flowchart showing the flow of operations performed by the height correction processing.

The sensor height change correction processing at step S12 mentioned above is executed according to the flowchart of FIG. 14. In the flowchart of FIG. 14, when step S12a and S12b find that the door is closed and that the ignition switch is on, step S12c checks if the correction data retrieve switch is on. If the correction data retrieve switch is found not closed, the processing goes to step S12d which checks if the car speed is between 5 km/h and 40 km/h.

When the car is traveling at speed between 5 km/h and 40 km/h, step S12e calculates from the displacements of light spots at several points to see if the monitored area is flat. If the monitored area is found to be flat at step 12f, step S12g calculates the vehicle sinking correction data from the light spot displacements at several points. When the correction data retrieve switch is turned on and the decision of step S12c is "yes," the processing moves to step S12g to calculate the vehicle sinking correction data from the light spot displacements at several points. With the processing of the flowchart of FIG. 14 executed, the data processor 6 works as a height correction means which corrects the reference data according to the changes in the camera height from the road surface.

The correction values may be taken in by manual operation of switch after the driver has checked that the road is flat without an obstacle. The correction values may also be taken in automatically by the processor when the processor judges that the road surface detected by the monitor when the vehicle is traveling at such a low constant speed (5–40 km/h) that the air resistance does not affect the vehicle is almost flat. It is also possible to take in the correction values whenever the processor decides that the road surface is flat.

The picture input processing at step S13 takes in the light spot projection image of the monitored area 4c as shown in FIG. 7. FIG. 8 shows the image signal output from the CCD camera 4 for one scanning line. Since the brightness of the light spots and the background are not uniform, the brightness threshold values for extracting the light spots are as indicated by the broken line (differing from one light spot to another). These threshold values are stored in memory as part of the reference data beforehand.

Figure 15:
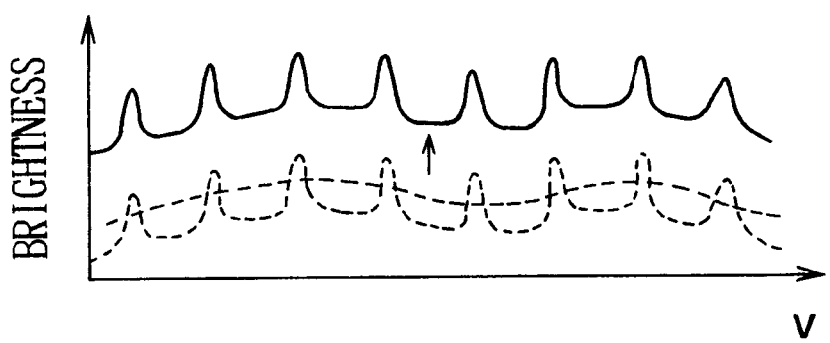
FIG. 15 is a diagram explaining the necessity of the brightness correction.

The detection of changes in background brightness of the picture and the correction of the brightness threshold values, which are both performed at step S14, are carried out for the following reasons. When it is intended to check for any obstacles by taking the light spot projection image to determine the displacements of the light spots, it is first necessary to extract the light spots from the image taken in. At this time, if the monitored area 4c is illuminated by the brake lamp of the vehicle itself or headlights of other cars, the brightness distribution changes as shown in FIG. 15, making it impossible to extract the light spots with the preset brightness threshold values. This results in an inability to detect obstacles or large detection errors.

To eliminate such troubles, when the light spot projection image is taken in to determine the displacements of the light spots, the brightness of the pixels prerecorded in the reference data that correspond to the background position are determined. Next, from the background brightness at several points thus determined, correction coefficients for the brightness threshold values are calculated. Based on these correction coefficients, the brightness threshold values in the reference data are corrected to extract the light spots.

Figure 16:
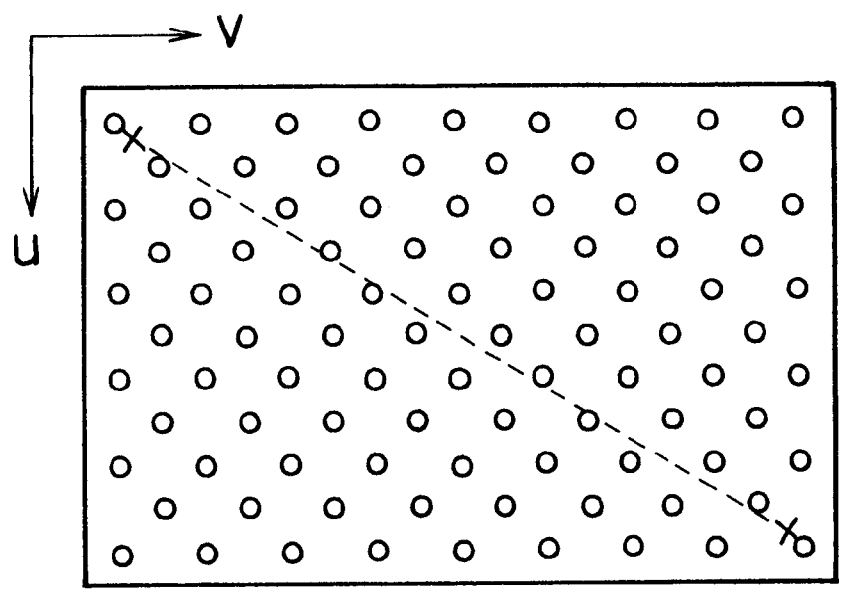
FIG. 16 is a diagram showing the method of making a brightness correction.

To describe in more detail by referring to FIG. 16, let us consider the upper left corner light spot and the lower right corner light spot in the monitored area 4c. On the basis of the brightness data of the pixels (marked x), which are considered the background of the two light spots, the correction coefficient A (brightness gradient in the direction of u-axis) is determined as indicated by equation (1). The brightness threshold values for individual light spots recorded in the reference data are corrected by equation (2).

$$A = \frac{I_{RL} - I_{LU}}{u_{RL} - u_{LU}} \quad (1)$$

$$Th'_{(i)} = Th_{(i)} + A \cdot (u_{(i)} - u_{LU}) + (I_{LU} - I_{BK}) \quad (2)$$

where

| | |
|---|---|
| A: | correction coefficient; |
| $u_{LU}$: | u coordinates of a specified pixel around the light spot at the upper left corner of the monitored area; |
| $I_{LU}$: | brightness of a specified pixel around the light spot at the upper left corner of the monitored area; |
| $u_{RL}$: | u coordinates of a specified pixel around the light spot at the lower right corner of the monitored area; |
| $I_{RL}$: | brightness of a specified pixel around the light spot at the lower right corner of the monitored area; |
| $Th'_{(i)}$: | brightness threshold value of an i-th light spot after being corrected; brightness threshold value of an i-th light spot before being corrected; |
| $Th_{(i)}$: | brightness threshold value of an i-th light spot after being corrected; |
| $u_{(i)}$: | u coordinates of an i-th light spot; and |
| $I_{BK}$: | background brightness when the reference data is retrieved. |

With the step S14 mentioned above executed, the data processor 6 determines the difference between the background brightness and the corresponding reference data on the basis of the pixel data, which was produced from the picture signal from the camera that photographed the light spot pattern projected onto the monitored road surface. Based on the background brightness difference thus obtained, the data processor 6 then corrects the brightness threshold values used for extracting the light spots.

The extraction of the displaced spots performed at step S15 is carried out for each light spot by using the corrected brightness threshold values Th' that are determined for each light spot. Step S16 determines the displacement of each light spot by using the coordinates of the extracted light spots and the reference data of the light spot coordinates and calculates the three-dimensional positions of the obstacle. The calculation of the correction coefficient at step S14 may utilize the common interpolation. The correction may use the background brightness data of the points located around the light spots to increase the precision though it requires a longer processing time.

The baricenter coordinates of the light spots thus extracted are determined from the pixels making up each of the light spots to determine the light spot coordinates on the image plane 4c. The calculation of the light spot coordinates can be applied both to determining the reference value of the flat road surface and to calculating the three-dimensional coordinates of the actual uneven road surface. The calculation of the light spot coordinates requires data of all pixels (for example 512×512 pixels) from the CCD camera. and therefore takes time. This means that while the light spot coordinates calculation does not pose any problem in determining the reference values for the flat road, it has the disadvantage of being slow in performing the actual monitoring.

In the geometrical layout shown in FIGS. 3 and 4, the light spot coordinates B (u, v+δ) on the image plane 4b in the case of an uneven road move only in a certain direction with respect to a point A (u, v) for the flat road. As shown in the figure, the light spot moves only in the direction of v. When the road surface bulges, the light spot moves in the direction of positive v and, when it recesses, moves in the direction of negative v. By making use of this characteristic, it is possible to speed up the calculation of the three-dimensional coordinates as described below.

Figure 18:
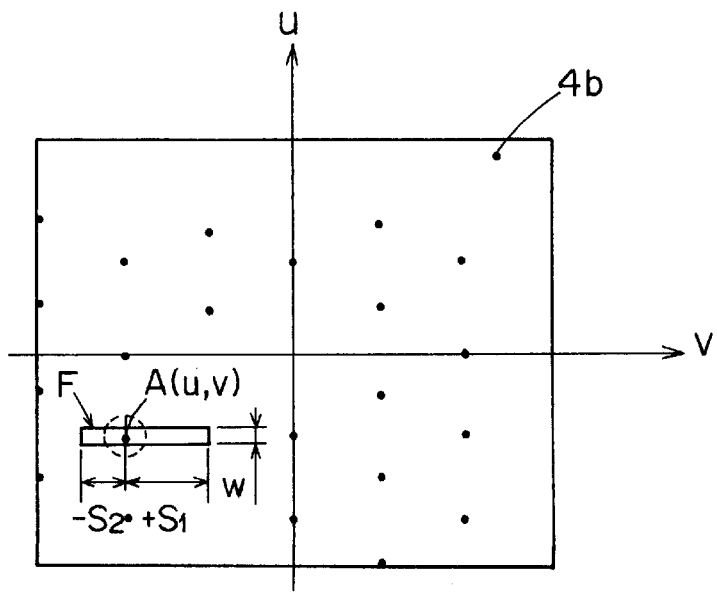
FIG. 18 is a diagram showing the method of setting the scan area.

In FIG. 18, A (u, v) represents a point on the image plane 4b that corresponds to a certain light spot on the flat road. The frame F indicates the area to be scanned during the three-dimensional coordinates measuring process. The sub-areas $+S_1$, $-S_2$ can be set arbitrarily according to the magnitude of the projections and depressions on the actual road. For example, in the case of passenger cars, the setting may be 1.5 m above the flat road surface and 0.5 m below the surface, and $+S_1$ and $-S_2$ can be set accordingly. It is noted that all the points shown in the figure represent the baricenter positions of the light spots. The distances in the direction of v between the adjacent light spots are so set that the light spots will not overlap each other when they move under the conditions mentioned above. They are arranged staggered in the direction of u for effective utilization of space.

During the measuring process, it is necessary to determine the light spot coordinates only in the scan area mentioned above. The light spot coordinates can be obtained by assuming that the pixels with brightness higher than the specified threshold value make up the light spot and by calculating the baricenter or geometric center of the light spot.

Figure 17:
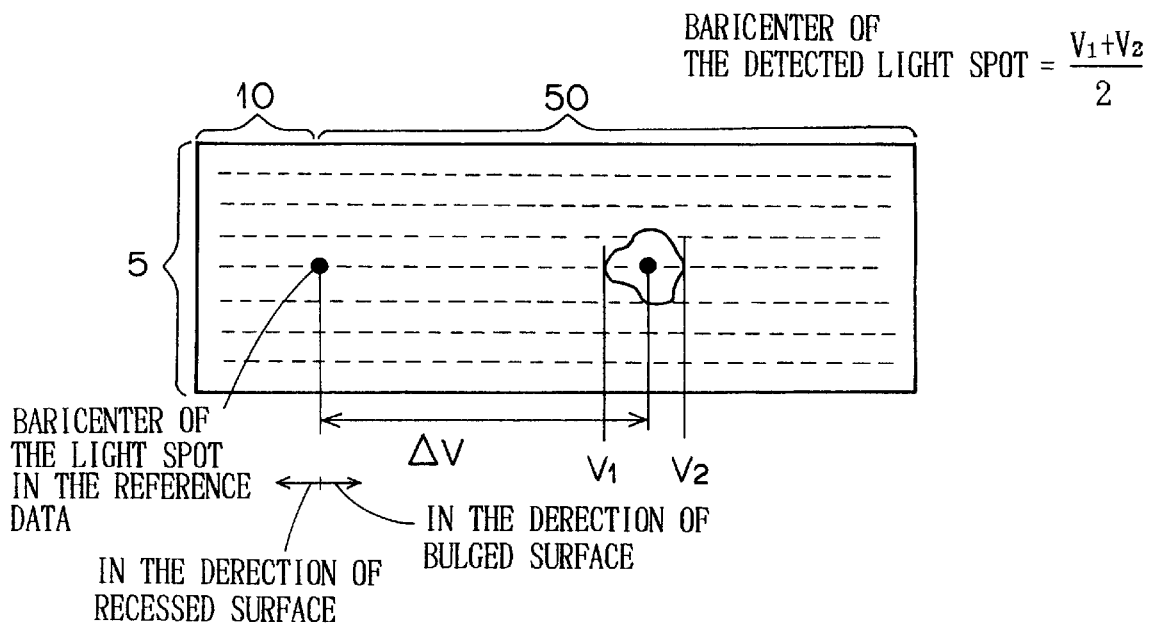
FIG. 17 is a diagram showing the method of determining the light spot baricenter and the distance of movement of light spot in the scan area during the 3-dimensional coordinates measurement.

This is detailed in the following. As shown in FIG. 17, on the same line as the light spot baricenter of the reference data, $V_1$ and $V_2$ are detected. The light spot baricenter $(V_1+V_2)/2$ is calculated to determine the amount of movement $\Delta V$, which is the distance between the two baricenters. If there is no light spot on the same line, the adjacent line, one level up or down, is scanned. $V_1$ and $V_2$ are detected by comparing the brightness of pixels with the brightness threshold value I. The scan region W may be one pixel line wide or multiple lines wide, for example, five pixel lines wide for better detection precision. While the above example uses a geometric center as the baricenter to increase the detection speed, it is however better to use the baricenter coordinates detection method, which was used in generating the reference data, to improve precision.

As explained above, since the method of this invention requires calculation of the light spot coordinates only in the set scan region, the speed of the measuring process can be increased.

Figure 19:
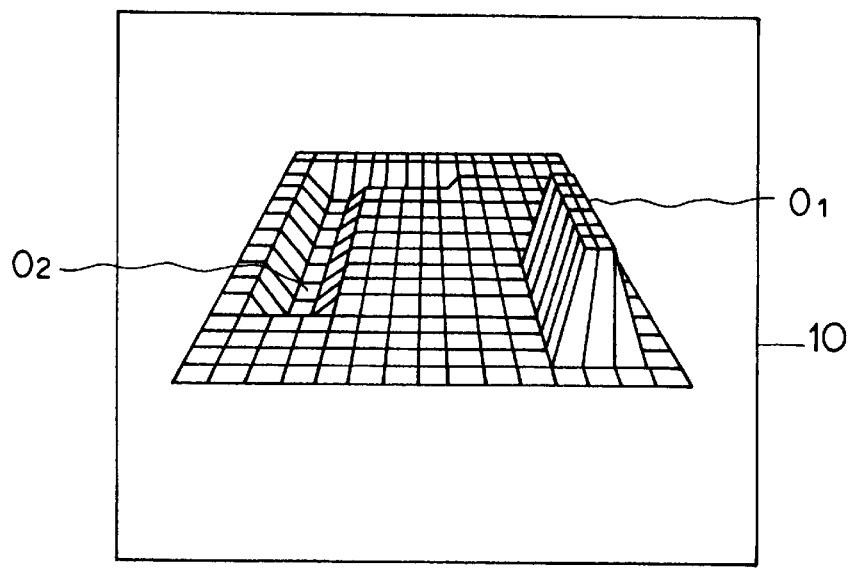
FIG. 19 is a diagram showing an example display of the result of the three-dimensional light spot position detection.

FIG. 19 shows an example display on the display device 10 that shows the result of detecting the three-dimensional positions of light spots when there are a wall and a ditch in the monitored area 4c. In the figure, $O_1$ is a wall and $O_2$ a ditch.

Next, we will describe the method of monitoring by using the steering angle sensor 8. In the embodiment, the path the automobile will take is predicted by using the steering angle detected by the steering angle sensor 8. The predicted path or route is superimposed on a two-dimensional map of the monitored area 4c showing obstacles to predict a possible contact or collision of the car body with obstacles. Upon detection of a possible contact or collision, an alarm is sounded from a buzzer or an alarm message which is generated by a voice synthesizing means in the data processor 6 is issued. The alarm may also be displayed on the display device 10 to alert the driver.

Figure 20:
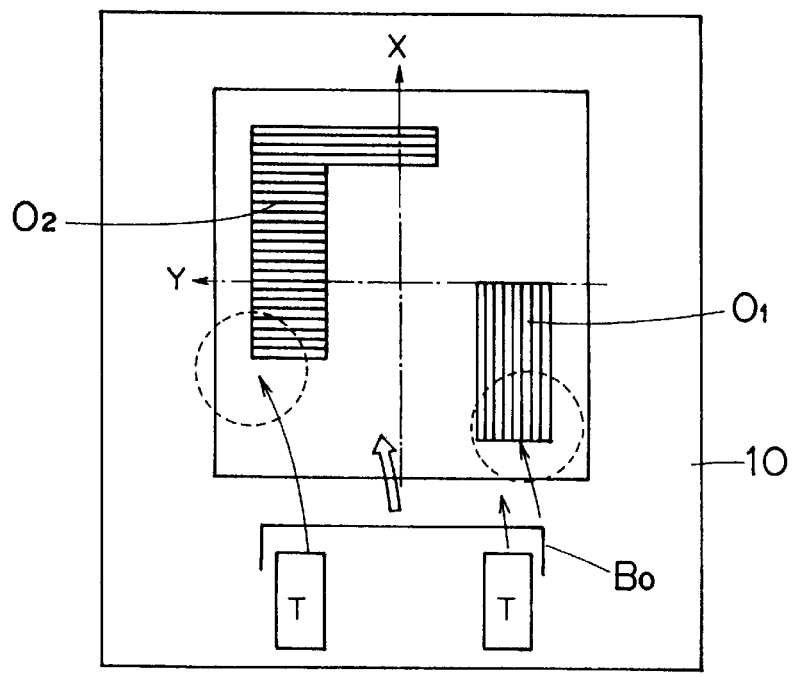
FIG. 20 is a diagram showing an example display of the result of the vehicle surroundings monitoring.

FIG. 20 shows one example display on the display device 10 showing the point at which the edge of the car body Bo will come into contact with an obstacle like a wall $O_1$ and the point at which the tire T falls into a ditch $O_2$. While the car is moving back, the data processor 6 processes the images supplied successively from the CCD camera 4 so that the obstacle $O_1$ and the ditch $O_2$ in the monitored area 4c are detected in real time, as shown in FIG. 20. Based on the predicted path the car will take, which is predicted from the steering angle from the steering angle detector 8, a possible contact with an obstacle is alerted to the driver beforehand, thus effectively helping the driver in assuring safety.

While the above embodiment uses a steering angle detection signal supplied from the steering angle detector 8 in predicting the path of the car, it is possible to use a rotary angle speed sensor or a direction sensor consisting of a gyro and process signals from these sensors to predict the path the car will take.

In the above embodiment we have described a case where the car driver is informed of the presence of obstacles or ditches in the monitored area. This invention, however, can also be applied to unmanned transport cars in factories and industrial robots in assembly lines.

As mentioned in the foregoing, with this invention it is possible to quickly detect the presence of obstacles or ditches in the surrounding of the vehicle. Not only does the apparatus of this invention display the sizes and positions of the obstacles or ditches but it also predicts and indicates the location at which the car will contact or strike the obstacle or its tire will fall in the ditch. This provides the driver with sufficient information to ensure safety in driving. Particularly when there is not enough lighting on the monitored area during nighttime, this invention provides a better means for checking safety than a simple visual check.

Another advantage of this invention is that even when the car is weighed down by passengers or heavy goods, the monitoring apparatus of the invention can precisely detect obstacles or ditches. Furthermore, when the monitored area is illuminated by brake lamps and its brightness increases, the apparatus has a means to prevent erroneous detection of light spots.

A further advantage is that upon detection of an obstacle the size and position of the obstacle is shown on the display device with or without an alarm buzzer sound. At the same time, the apparatus predicts the path the car will take and shows on the display device the location where the car will contact or collide with the obstacle to alert the driver.

What is claimed is:

1. A surroundings monitor for a vehicle moving over a supporting surface comprising:

a two-dimensional matrix pattern light projector which receives a laser beam and projects a two-dimensional light spot matrix pattern downward onto a monitored area within said supporting surface located in closed proximity to vehicle;

a camera for photographing the light spot matrix pattern; and a data processor which processes image signals supplied from the camera to detect the presence of obstacles and depressions in the monitored area within said supporting surface, wherein said data processor further comprises:

a reference data generating means which extracts a light spot pattern from pixel data, the pixel data including a coordinate position of the light spot baricenter which is obtained from the image signals supplied by the camera that photographed the light spot pattern projected upon a flat road surface when a sensing means is first mounted on a vehicle;

a detecting means which compares the light spots of the reference data with light spots which are extracted from pixel data, the pixel data being produced from the image signals supplied by the camera that photographed the light spot pattern projected upon a road surface being examined, in order to detect the presence of obstacles and depressions; and a height correction means which corrects the three-dimensional coordinates of the road surface according to changes in the camera height from the road surface, wherein said height correction means first detects displacements of the three-dimensional coordinates of light spots at several predetermined points from those at the same points of said reference data with passengers on board the vehicle, determines a height correction value by the amount of sinkage of the vehicle caused by a weight of the passengers, said amount being calculated from said detected displacements, and subtracts said height correction value from the actual three-dimensional coordinates of the road surface for obtaining the actual road surface being examined.

2. A surrounds monitor for a vehicle as claimed in claim 1, wherein said data processor further comprises:

a brightness correction means which corrects the threshold values for individual light spots recorded in the reference data to extract light spots from the pixel data, which is produced from image signals supplied by the camera that photographed the light spot pattern projected upon the road surface being examined, according to a difference between the brightness of a background other than the light spots and the background brightness of the reference data.

3. A surroundings monitor for a vehicle as claimed in claims 1 or 2, further comprising:

a vehicle path prediction means for calculating the path the vehicle will take and thereby predicting a possible contact or collision of the vehicle with obstacles.

4. A surroundings monitor for a vehicle as claimed in claim 3, further comprising:

at least one of a buzzer, voice synthesizer and display device to inform a driver of the vehicle of the presence of obstacles, wherein said voice synthesizer and said display device are also capable of informing the driver of the location in which the vehicle is predicted to contact the obstacles along said path.

5. A surroundings monitor for a vehicle as claimed in claim 1, wherein said two-dimensional matrix pattern light projector comprises a fiber grating.

6. A surroundings monitor for a vehicle as claimed in claim 1, wherein said two-dimensional matrix pattern light projector comprises a multi-beam projector consisting of a plurality of microlenses integrated onto a thin transparent plate.

7. A surroundings monitor for a vehicle as claimed in claim 1, wherein said height correction means determines said height correction value only when the road surface is detected to be a horizontal plane.

8. A surroundings monitor for a vehicle as claimed in claim 7, wherein said height correction means operates only when the travel speed of the vehicle is within a predetermined speed range.

* * * * *